US008000181B2

(12) United States Patent
Yamada (10) Patent No.: US 8,000,181 B2
(45) Date of Patent: Aug. 16, 2011

(54) BEAM IRRADIATION DEVICE AND LASER RADAR

(75) Inventor: Masato Yamada, Inuyama (JP)

(73) Assignees: SANYO Electric Co., Ltd., Osaka (JP); SANYO Optec Design Co., Ltd., Tokyo (JP)

( * ) Notice: Subject to any disclaimer, the term of this patent is extended or adjusted under 35 U.S.C. 154(b) by 266 days.

(21) Appl. No.: 12/201,563

(22) Filed: Aug. 29, 2008

(65) Prior Publication Data

US 2009/0059766 A1 Mar. 5, 2009

(30) Foreign Application Priority Data

Aug. 31, 2007 (JP) ................................ 2007-225288

(51) Int. Cl.
*G11B 7/00* (2006.01)
*G01C 3/08* (2006.01)
(52) U.S. Cl. ............... 369/44.11; 369/112.01; 356/3.09; 356/4.01
(58) Field of Classification Search ............... 369/44.11, 369/44.14, 44.23, 44.28, 112.01, 112.23, 369/112.24; 356/3.09, 4.01, 28, 141.1, 614, 356/624
See application file for complete search history.

(56) References Cited

U.S. PATENT DOCUMENTS

| | | | | |
|---|---|---|---|---|
| 5,046,061 A | * | 9/1991 | Chaya et al. ............. | 369/112.17 |
| 5,627,669 A | * | 5/1997 | Orino et al. .................. | 398/129 |
| 5,914,785 A | * | 6/1999 | Allison et al. ................ | 356/614 |
| 5,978,148 A | * | 11/1999 | Oono et al. .................. | 359/668 |
| 6,428,171 B1 | * | 8/2002 | Aoki et al. ................... | 356/634 |
| 6,693,272 B2 | * | 2/2004 | Adachi et al. ................ | 250/216 |
| 7,126,883 B2 | * | 10/2006 | Yamamoto et al. ........ | 369/13.06 |
| 7,463,560 B2 | * | 12/2008 | Kanou ........................ | 369/44.25 |
| 7,561,500 B2 | * | 7/2009 | Nagura ....................... | 369/44.23 |
| 7,630,279 B2 | * | 12/2009 | Mitsuda ..................... | 369/44.26 |
| 2005/0157611 A1 | * | 7/2005 | Kishima et al. ............ | 369/44.23 |
| 2005/0180283 A1 | * | 8/2005 | Ishimoto et al. ........... | 369/44.32 |
| 2006/0219875 A1 | * | 10/2006 | Yamada ....................... | 250/221 |
| 2006/0265147 A1 | * | 11/2006 | Yamaguchi et al. ............ | 702/40 |
| 2007/0195393 A1 | * | 8/2007 | Yamada et al. ............... | 359/196 |
| 2007/0274188 A1 | * | 11/2007 | Kikuchi .................... | 369/112.01 |

FOREIGN PATENT DOCUMENTS

| | | |
|---|---|---|
| JP | 2006-252264 A | 9/2006 |
| JP | 2007-108155 A | 4/2007 |

* cited by examiner

*Primary Examiner* — Thang V Tran
(74) *Attorney, Agent, or Firm* — Ditthavong Mori & Steiner, P.C.

(57) ABSTRACT

A beam irradiation device includes a light source for emitting laser light, an actuator for displacing a propagation direction of the laser light in accordance with a control signal, and a scan expansion lens for increasing a swing width of the laser light to be generated by the actuator. A spectral element is arranged between the actuator and the scan expansion lens. The spectral element allows at least a part of the laser light to be incident from the actuator to transmit, and reflects at least a part of the laser light to be incident from the scan expansion lens. The beam irradiation device further includes a light detector for receiving the laser light to be reflected on the spectral element to output an electrical signal.

5 Claims, 7 Drawing Sheets

EMISSION TIMING OF DETECTION LASER LIGHT

FIG. 4B

OUTPUT OF PD AMPLIFIER

BEAM IRRADIATION DEVICE AND LASER RADAR

This application claims priority under 35 U.S.C. Section 119 of Japanese Patent Application No. 2007-225288 filed Aug. 31, 2007, entitled "BEAM IRRADIATION DEVICE AND LASER RADAR".

BACKGROUND OF THE INVENTION

1. Field of the Invention

The present invention relates to a laser radar for irradiating laser light to a target area, and detecting a state of the target area based on a receiving state of the laser light reflected on the target area, and a beam irradiation device suitably used in the laser radar.

2. Description of the Related Art

In recent years, a laser radar for detecting a state of a target area by irradiating laser light to the target area has been loaded in a family automobile or the like. The laser radar is configured in such a manner that the target area is scanned with laser light to detect an obstacle (i.e. an object to be detected) based on a receiving state of reflection light from the target area, and at the same time, the distance to the obstacle is measured.

A beam irradiation device is incorporated in the laser radar as an arrangement for scanning the target area with laser light. The target area is scanned with laser light by using e.g. a lens actuator. A scan lens is two-dimensionally driven in a direction perpendicular to the optical axis of laser light in accordance with driving of the lens actuator. Thereby, the target area is scanned with laser light.

The beam irradiation device may have an arrangement for increasing the swing width of laser light. For instance, an attachment lens (i.e. a scan expansion lens) is provided in front of the scan lens. The attachment lens is advantageous in further increasing the swing width of laser light to be generated by displacing the scan lens.

The laser radar has a detector for receiving reflection light from the target area. The detector receives reflection light from an obstacle at a scan position of laser light, and outputs a detection signal. The detector may be constituted of e.g. a light receiving element such as a photodiode, and a condenser lens for condensing reflection light from the obstacle and guiding the condensed light to the light receiving element. The condenser lens has a lens surface facing the target area in forward direction to receive the reflection light from the target area.

In the case where the attachment lens is provided with the detector, the attachment lens and the condenser lens are arranged at such a position that the directions of the lens diameter thereof are aligned with each other.

The condenser lens has a significantly large size in the lens diameter direction thereof to receive reflection light from the target area in a wide range. As a result, the detector has a large size in the lens diameter direction of the condenser lens. On the other hand, a light receiving surface of the light receiving element for receiving reflection light from the target area has a considerably small size, as compared with the lens diameter of the condenser lens. As a result, a large dead space is defined between the condenser lens and the light receiving element. The dead space obstructs miniaturization of the beam irradiation device and the laser radar. Also, since the lens diameter of the condenser lens is large, there is a problem that the size of the beam irradiation device and the laser radar may be increased in the lens diameter direction.

In the laser radar, generally, the distance to the obstacle is measured based on a difference in time between an emission timing of laser light, and a receiving timing of reflection light from the target area. In this arrangement, the time difference is measured based on an output timing of a signal (i.e. an emission signal) indicating emission of laser light, and an output timing of a signal (i.e. a light receiving signal) indicating receiving of reflection light from the light receiving element. In this arrangement, there is a time lag between the point of time when the emission signal is outputted, and the point of time when the laser light is actually emitted. There is also a time lag between the point of time when the light receiving signal is outputted in response to actual receiving of reflection light, and the point of time when the light receiving signal reaches a processing circuit.

In a circuit system, generally, a time difference between the emission timing of laser light, and the light receiving timing of reflection light from the target area is measured, taking the aforementioned time lags into consideration. However, there is a case that the aforementioned time lags include an error resulting from a characteristic of a laser light source or a light receiving element. If the error is included, the time difference between the emission timing of laser light, and the light receiving timing of reflection light from the target area may include an error. As a result, measurement precision of the distance to the obstacle may be lowered.

SUMMARY OF THE INVENTION

An object of the invention is to satisfactorily reduce the outer dimensions of a device. Another object of the invention is to enhance measurement precision of the distance to an obstacle.

A beam irradiation device according to a first aspect of the invention includes: a light source for emitting laser light; an actuator for displacing a propagation direction of the laser light in accordance with a control signal; a scan expansion lens for increasing a swing width of the laser light to be generated by the actuator; a spectral element, arranged between the actuator and the scan expansion lens, for allowing at least a part of the laser light to be incident from the actuator to transmit, and reflecting at least a part of the laser light to be incident from the scan expansion lens in a side direction; and a light detector for receiving the laser light to be reflected on the spectral element to output an electrical signal.

In the beam irradiation device according to the first aspect, the laser light reflected on the target area is guided to the light detector via the scan expansion lens and the spectral element. This arrangement eliminates the need of additionally providing a condenser lens for condensing laser light reflected on the target area. Thereby, this arrangement enables to avoid a drawback that the size of the beam irradiation device may be increased due to provision of a condenser lens.

A laser radar according to a second aspect of the invention includes: a beam irradiation device for irradiating laser light to a target area; and a detection circuit for detecting a state of the target area based on a receiving state of the laser light to be reflected on the target area. In this arrangement, the beam irradiation device includes: a light source for emitting the laser light; an actuator for displacing a propagation direction of the laser light in accordance with a control signal; a scan expansion lens for increasing a swing width of the laser light to be generated by the actuator; a spectral element, arranged between the actuator and the scan expansion lens, for allowing at least a part of the laser light to be incident from the actuator to transmit, and reflecting at least a part of the laser light to be incident from the scan expansion lens in a side direction; and a light detector for receiving the laser light to be reflected on the spectral element to output an electrical signal. The detection circuit detects the state of the target area based on the electrical signal to be outputted from the light detector.

The laser radar according to the second aspect has substantially the same effect as the beam irradiation device according to the first aspect.

In the laser radar according to the second aspect, preferably, the detection circuit may calculate a distance to an object to be detected, based on an output timing of the electrical signal being derived from the laser light to be reflected on a lens surface of the scan expansion lens, and an output timing of the electrical signal being derived from the laser light to be reflected on the object to be detected in the target area.

In the above arrangement, a time difference between the two output timings of the electrical signals accurately corresponds to a time required for the laser light to reciprocate between the scan expansion lens and the object to be detected (i.e. an obstacle). Thus, the detection circuit enables to calculate the distance to the object to be detected (i.e. the obstacle) with high precision.

BRIEF DESCRIPTION OF THE DRAWINGS

These and other objects, and novel features of the present invention will become more apparent upon reading the following detailed description along with the accompanying drawings.

The drawings are provided mainly for describing the present invention, and do not limit the scope of the present invention.

DESCRIPTION OF THE PREFERRED EMBODIMENTS

In the following, embodiments of the invention are described referring to the drawings.

First Embodiment

Figure 1:
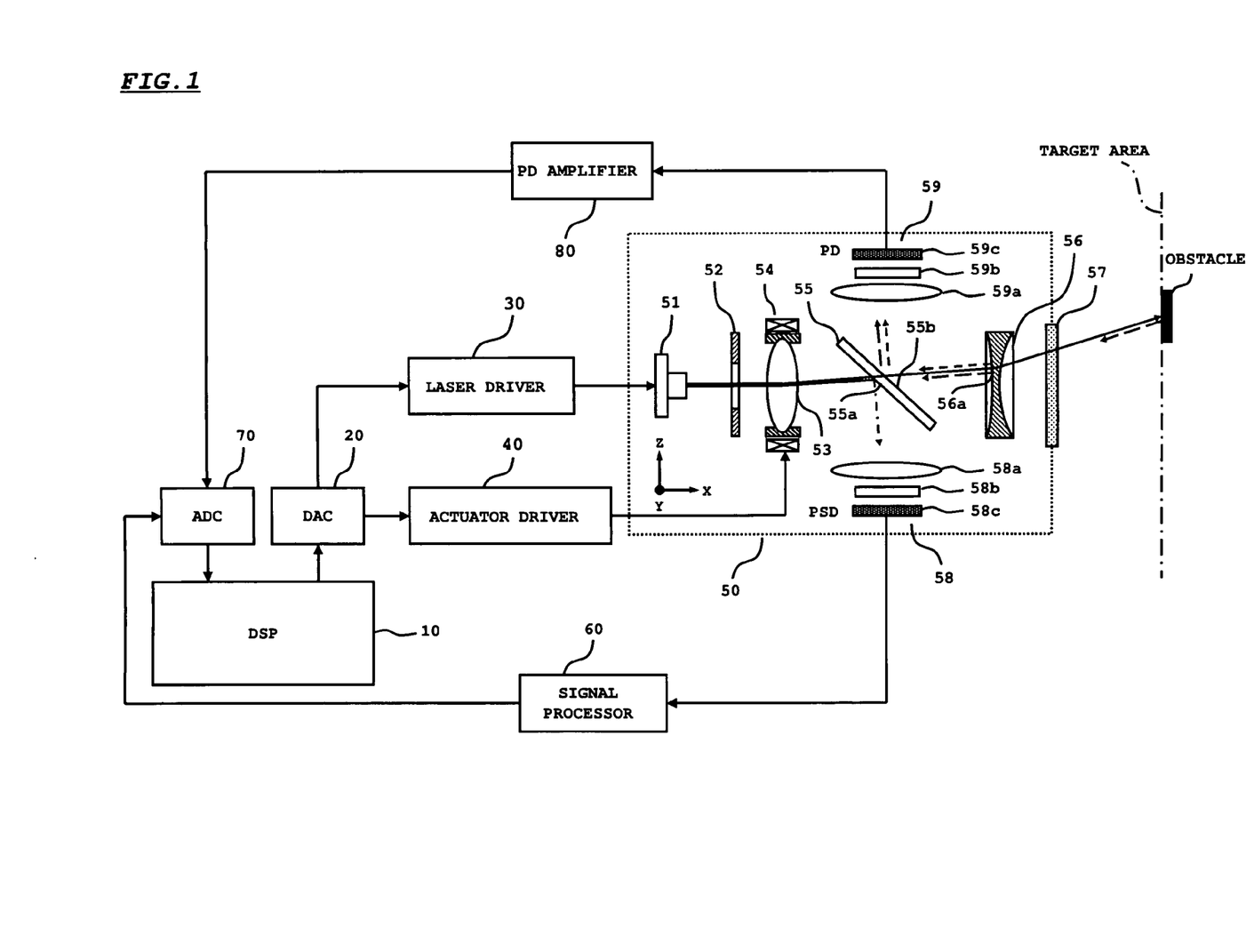
FIG. 1 is a diagram showing an arrangement of a laser radar in accordance with a first embodiment of the invention.

FIG. 1 is a diagram showing an arrangement of a laser radar in accordance with the first embodiment of the invention.

As shown in FIG. 1, the laser radar includes a DSP (Digital Signal Processor) 10, a DAC (Digital Analog Converter) 20, a laser driver 30, an actuator driver 40, a beam irradiation head 50 (corresponding to a beam irradiation device of the invention), a signal processor 60, an ADC (Analog Digital Converter) 70, and a PD amplifier 80.

The DSP 10 outputs, to the DAC 20, a signal (i.e. an emission signal) for emitting laser light, and a signal (i.e. a drive signal) for driving an actuator. The DAC 20 converts the emission signal inputted from the DSP 10 into an analog signal for outputting the analog signal to the laser driver 30, and converts the drive signal inputted from the DSP 10 into an analog signal for outputting the analog signal to the actuator driver 40.

The laser driver 30 drives a semiconductor laser 51 provided in the beam irradiation header 50 in accordance with the emission signal inputted from the DAC 20. The actuator driver 40 drives a lens actuator 54 provided in the beam irradiation head 50 in accordance with the drive signal inputted from the DAC 20.

The beam irradiation head 50 includes the semiconductor laser 51, an aperture 52, a scan lens 53, the lens actuator 54, a beam splitter 55, a scan expansion lens 56, a light transmitting window 57, a position detector 58, an a reflection light detector 59.

The semiconductor laser 51 houses two laser elements in a can-type package. The two laser elements emit laser light of wavelengths different from each other. One of the laser light is laser light (hereinafter, called as "detection laser light") for use in detecting an obstacle. The other of the laser light is laser light (hereinafter, called as "servo laser light") for use in servo control. The detection laser light is high output laser light having a wavelength of e.g. 780 nm, and is intermittently emitted every predetermined timing (e.g. every 10 μsec.) in scanning a target area. The servo laser light is low output laser light having a wavelength of e.g. 660 nm, and is continuously emitted in scanning the target area.

The laser light (i.e. detection laser light/servo laser light) emitted from the semiconductor laser 51 is shaped into an intended shape by the aperture 52 before incidence onto the scan lens 53. The scan lens 53 is constituted of a convex lens having two aspheric surfaces, and the scan lens 53 forms the laser beam incident from the semiconductor laser 51 into the convergent light smaller than a parallel light. The scan lens 53 is supported on the lens actuator 54 in such a manner that the scan lens 53 is displaceable in the Y-Z plane direction in FIG. 1. An emission angle of laser light transmitted through the scan lens 53 is changed in the Y-Z plane direction in accordance with driving of the lens actuator 54. The lens actuator 54 adjusts the scan lens 53 in such a manner that the center axis of the scan lens 53 is aligned with the center axis of the scan expansion lens 56, when the scan lens 53 in a neutral position.

Figure 2:
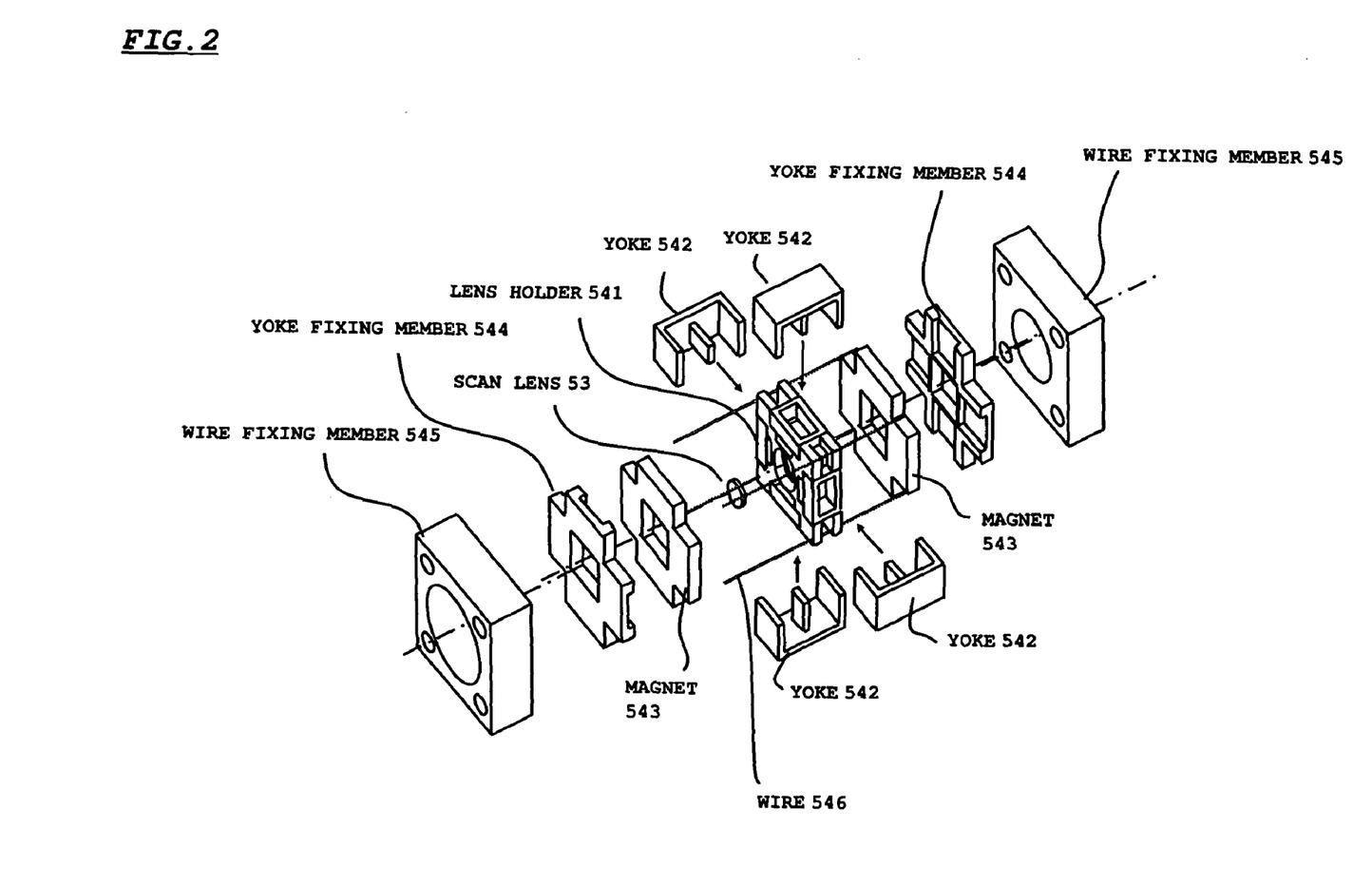
FIG. 2 is a diagram showing an arrangement of a lens actuator in the first embodiment.

FIG. 2 is an exploded perspective view showing an arrangement of the lens actuator 54.

Referring to FIG. 2, the scan lens 53 is mounted in an opening formed in a center of a lens holder 541. Coils are mounted on four side walls of the lens holder 541, respectively. A middle protruding portion of a yoke 542 is received in each coil in a corresponding direction shown in FIG. 2. Opposing extensions of each yoke 542 are fitted in respective corresponding recesses of a pair of yoke fixing members 544. Also, magnets 543 are fixedly mounted on the respective corresponding yoke fixing members 544 in such a manner that the extensions of the yokes 542 are sandwiched between the magnets 543 and the yoke fixing members 544. In this state, the yoke fixing members 544 and the magnets 543 are mounted on a base member (not shown).

A pair of wire fixing members 545 are also mounted on the base member. The lens holder 541 is resiliently supported on the wire fixing members 545 via wires 546. Holes are formed in four corners of the lens holder 541 for passing the wires 546 therethrough. After each wire 546 is passed in the corresponding hole of the lens holder 541, both ends of each wire 546 are fixed to the wire fixing members 545. Thereby, the lens holder 541 is resiliently supported on the wire fixing members 545 via the wires 546.

In driving the scan lens 53, a drive signal is supplied from the actuator driver 40 to each coil mounted on the lens holder 541. Thereby, an electromagnetic driving force is generated, and the scan lens 53 is two-dimensionally driven along with the lens holder 541.

Referring back to FIG. 1, the beam splitter 55 is constituted of a parallel plate-like glass plate, and is arranged at such a position that an incident surface 55a of the beam splitter 55 on the side of the scan lens 53 is tilted at about 45 degrees with respect to the optical axis of the scan lens 53. Parts of the detection laser light and the servo laser light transmitted through the scan lens 53 are respectively reflected on the beam splitter 55, and the remainders thereof are respectively transmitted through the beam splitter 55.

The detection laser light and the servo laser light reflected on the beam splitter 55 are propagated in the direction shown by the one-dotted chain line shown in FIG. 1, and guided to the position detector 58. The position detector 58 includes a servo lens (i.e. a condenser lens) 58a, a band-pass filter 58b, and a PSD (Position Sensitive Detector) 58c. The detection laser light and the servo laser light reflected on the beam splitter 55 are converged on the servo lens 58a before incidence onto the band-pass filter 58b. In the incidence onto the band-pass filter 58b, the detection laser light is cut off by the band-pass filter 58b, and only the servo laser light is transmitted through the band-pass filter 58b. As a result of this operation, merely the servo laser light is converged on the PSD 58c.

The PSD 58c has a light receiving surface in parallel to the X-Y plane in FIG. 1. The PSD 58c outputs an electric current depending on a convergence position of servo laser light on the light receiving surface. In the embodiment, the convergence position of servo laser light on the light receiving surface of the PSD 58c, and the irradiation position of detection laser light to be irradiated to the target area have one-to-one correspondence. Accordingly, the electric current to be outputted from the PSD 58c corresponds to the irradiation position of detection laser light on the target area.

The detection laser light and the servo laser light transmitted through the beam splitter 55 are incident onto the scan expansion lens 56. The scan expansion lens 56 is constituted of a concave lens for imparting, to laser light, a function of spreading the laser light in all the circumferential directions, and converts the detection laser light and the servo laser light to be incident onto the scan expansion lens 56 as convergence light into parallel light.

By the function of the scan expansion lens 56, the swing width of detection laser light after being transmitted through the scan expansion lens 56 is increased, as compared with the swing width of detection laser light before being transmitted through the scan expansion lens 56. As described in the embodiment, in the case where the detection laser light after being transmitted through the scan expansion lens 56 is parallel light, assuming that the beam diameter (to be obtained by a ray tracking method) of detection laser light after being transmitted through the scan expansion lens 56 is 1/n of the beam diameter (to be obtained by the ray tracking method) of detection laser light to be incident onto the scan lens 53, scanning with use of the detection laser light can be performed at the swing width (n) times as large as the swing width to be used in an arrangement that the scan expansion lens 56 is not provided. The details on the function of the scan expansion lens 56 is recited in Japanese Unexamined Patent Publication No. 2007-108155.

The detection laser light and the servo laser light that have been converted into parallel light by the scan expansion lens 56 are irradiated to a target area through the light transmitting window 57, as shown by the solid line in FIG. 1. It should be noted that the servo laser light has a low output, and accordingly does not perform a function of detecting an obstacle. Therefore, substantially the detection laser light is irradiated to the target area, as laser light for detecting an obstacle.

In the case where an obstacle is in the target area, the detection laser light is reflected on the obstacle. The detection laser light (hereinafter, called as "TG detection laser light") reflected on the obstacle is transmitted through the light transmitting window 57, and then, as shown by the long broken line in FIG. 1, guided to the beam splitter 55 by the scan expansion lens 56. An incident surface 55b (i.e. a surface opposite to the incident surface 55a) of the beam splitter 55 on the side of the scan expansion lens 56 is tilted at about 45 degrees with respect to the optical axis of the scan expansion lens 56. Accordingly, a part of the TG detection laser light is reflected on the incident surface 55b, and guided to the reflection light detector 59.

The reflection light detector 59 includes a condenser lens 59a, an IR pass filter 59b, and a PD (Photo Detector) 59c. The PD 59c is constituted of e.g. an avalanche photodiode (APD). The condenser lens 59a is arranged at a position opposing to the incident surface 55b of the beam splitter 55. The condenser lens 59a is arranged at such a position that the lens diameter direction thereof is aligned in X-Y direction in FIG. 1.

The TG detection laser light reflected on the beam splitter 55 is condensed on the condenser lens 59a, and irradiated to the PD 59c via the IR pass filter 59b. In the incidence onto the PD 59c, the IR pass filter 59b cuts off light of a wavelength other than the wavelength of the detection laser light e.g. visible light or servo laser light.

The incident lens surface 56a of the scan expansion lens 56 on the side of the beam splitter 55 is not applied with an antireflective coat. Accordingly, parts of the detection laser light and the servo laser light to be incident onto the incident lens surface 56a on the side of the beam splitter 55 are reflected on the incident lens surface 56a, and returned to the beam splitter 55.

Similarly to the TG detection laser light reflected on the obstacle, out of the reflection light, a part of the detection laser light (hereinafter, called as "RE detection laser light") reflected on the incident lens surface 56a is reflected on the beam splitter 55, and guided to the reflection light detector 59. Specifically, the TG detection laser light reflected on the beam splitter 55 is condensed on the condenser lens 59a, and irradiated to the PD 59c via the IR pass filter 59b. On the other hand, the servo laser light reflected on the incident lens surface 56a is cut off by the IR pass filter 59b. As a result, out of the RE detection laser light and the servo laser light reflected on the incident lens surface 56a, only the RE detection laser light is irradiated to the PD 59c.

Upon irradiation of the TG detection laser light or the RE detection laser light on the PD 59c, as described above, the PD 59c outputs, to the PD amplifier 80, a signal in accordance with a light receiving amount of the TG detection laser light or the RE detection laser light. The PD amplifier 80 amplifies the signal from the PD 59c, and outputs the amplified signal to the ADC 70. The ADC 70 converts the signal from the PD amplifier 80 into a digital signal, and outputs the digital signal to the DSP 10.

A current signal outputted from the PSD 58c is inputted to the signal processor 60. The signal processor 60 generates a voltage signal representing a convergence position of servo laser light, based on the current signal inputted from the PSD 58c, and outputs the voltage signal to the ADC 70. The ADC 70 converts the inputted voltage signal into a digital signal, and outputs the digital signal to the DSP 10.

As will be described later, the DSP 10 detects whether an obstacle is in the target area, based on the signal inputted from the PD 59c via the PD amplifier 80 and the ADC 70, and also calculates a distance to the obstacle.

The DSP 10 also detects the convergence position of servo laser light on the light receiving surface of the PSD 58c, based on the voltage signal inputted from the signal processor 60 via the ADC 70, and detects the irradiation position of detection laser light in the target area, based on the convergence position. The DSP 10 outputs a control signal to the actuator driver 40 via the DAC 20 based on the detection result, and performs servo control in such a manner that the irradiation position of detection laser light follows a predetermined scan trajectory.

Figure 3:
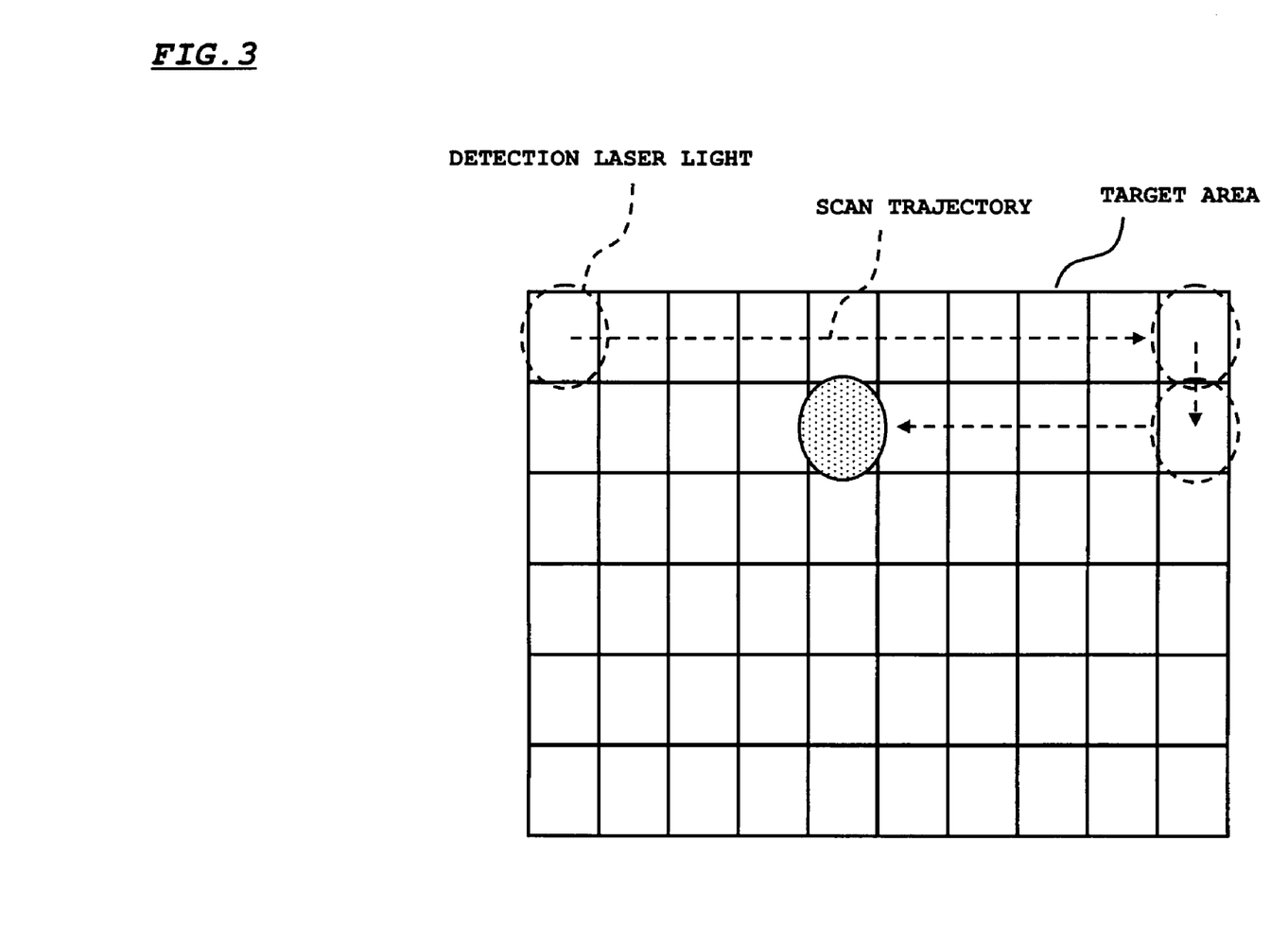
FIG. 3 is a diagram for illustrating a scan trajectory by detection laser light in the first embodiment.

When the operation of scanning the target area is performed, the lens actuator 54 is driven by the actuator driver 40 to move the scan lens 53 in horizontal and vertical directions within the Y-Z plane. Concurrently, the DSP 10 outputs an emission signal indicating emission of detection laser light every predetermined timing. In response to the output of the emission signal, the semiconductor laser 51 is driven, and the detection laser light is irradiated to the target area as described above. Thereby, as shown in FIG. 3, the detection laser light is moved along a predetermined scan trajectory, thereby scanning the target area.

During the scan operation, servo laser light is continuously emitted from the semiconductor laser 51. As described above, the servo laser light is guided to the PSD 58c, and the PSD 58c, in turn, outputs a signal (i.e. a current signal) depending on the irradiation position of detection laser light. Then, in the case where it is judged that the detection laser light does not follow the scan trajectory based on the current signal, the lens actuator 54 is driven to return the detection laser light to the scan trajectory based on the control signal from the DSP 10.

Figure 4A:
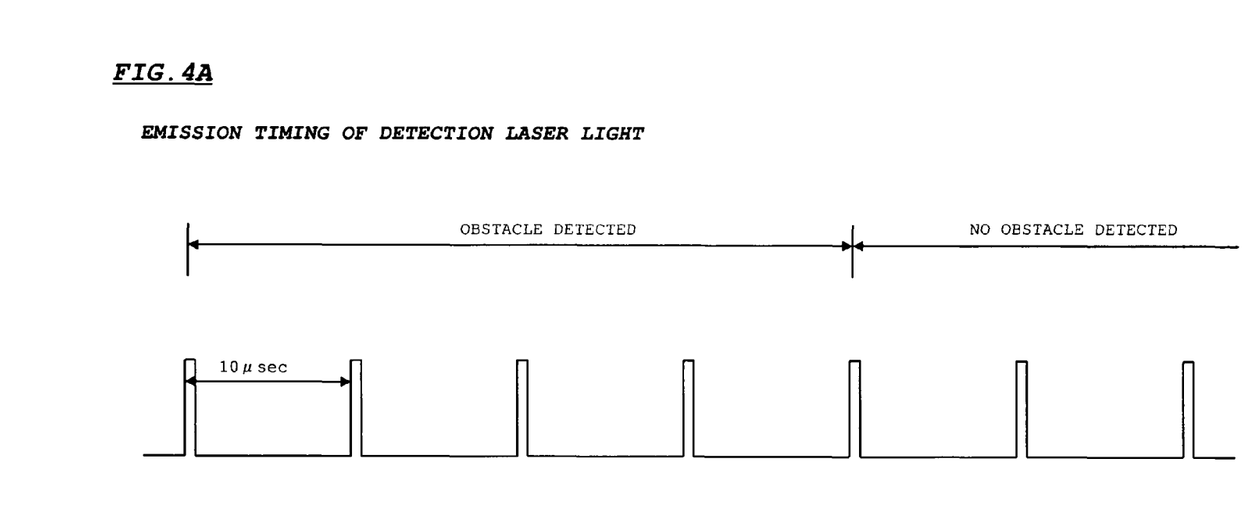
FIGS. 4A and 4B are diagrams showing a relation between an emission timing of detection laser light to be emitted from a semiconductor laser, and an output of a PD amplifier in the first embodiment.
Figure 4B:
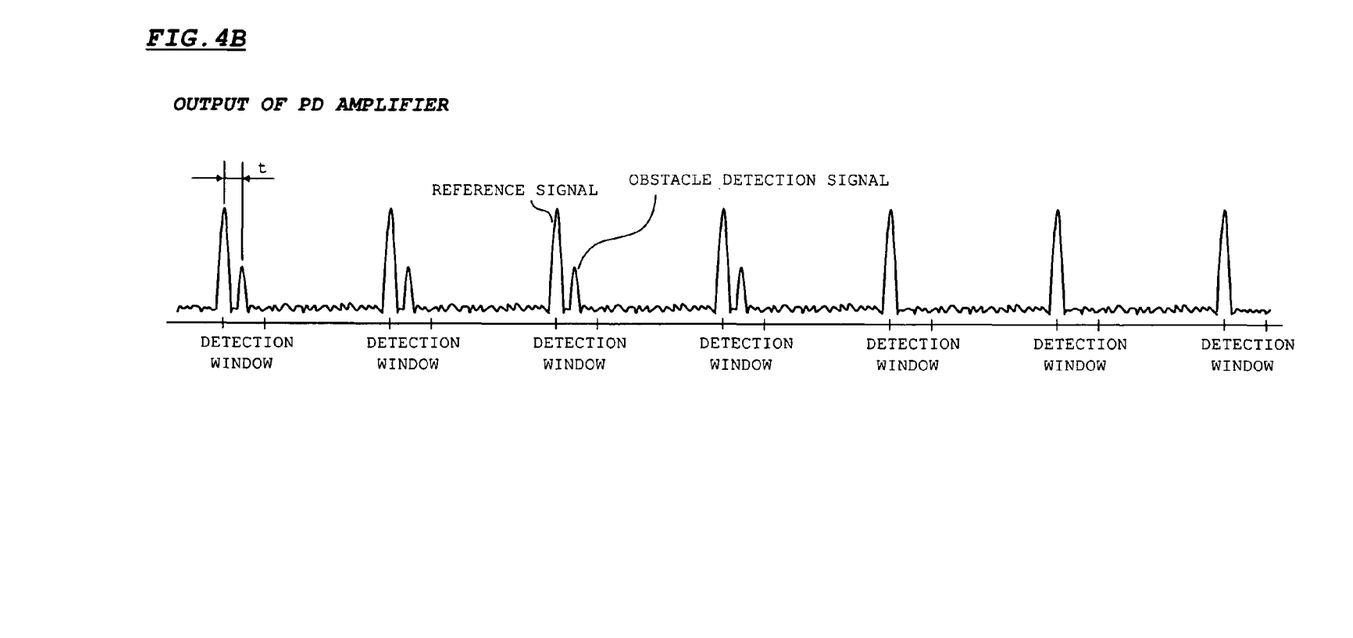

FIGS. 4A and 4B are diagrams showing a relation between an emission timing of detection laser light from the semiconductor laser 51, and an output of the PD amplifier 80.

As shown in FIG. 4A, the semiconductor laser 51 emits detection laser light e.g. every 10 μsec. As described above, a part of the detection laser light emitted from the semiconductor laser 51 is reflected on the incident lens surface 56a of the scan expansion lens 56, and the reflection light (i.e. RE detection laser light) is received on the PD 59c. As a result of this operation, as shown in FIG. 4B, substantially instantaneously after emission of detection laser light, the PD amplifier 80 outputs a light receiving signal (hereinafter, called as a "reference signal") indicating receiving of RE detection laser light. Specifically, the reference signal is outputted every about 10 μsec. in synchronism with the emission timing of detection laser light.

In the case where there is no obstacle at the irradiation position of detection laser light in the target area, there is no reflection light (i.e. TG detection laser light) from the obstacle, and no TG detection laser light is received on the PD 59c. In this condition, as shown by a period corresponding to the indication "no obstacle detected" in FIG. 4(a), there is no likelihood that the PD amplifier 80 may output a light receiving signal following the reference signal.

On the other hand, in the case where there is an obstacle at the irradiation position of detection laser light, reflection light (i.e. TG detection laser light) from the obstacle is generated, and the TG detection laser light is received on the PD 59c. In this condition, as shown by a period corresponding to the indication "obstacle detected" in FIG. 4(a), the PD amplifier 80 outputs a light receiving signal (hereinafter, called as an "obstacle detection signal") indicating receiving of TG detection laser light, following the output of the reference signal.

DSP 10 monitors the output signal from the PD amplifier 80, which has been digitized by the ADC 70, during the scan operation. Specifically, the DSP 10 detects a peak value of the output signal, compares the peak value with a predetermined threshold value, and detects output timings of the reference signal and the obstacle detection signal. More specifically, the DSP 10 defines a timing at which the peak value has exceeded the predetermined threshold value for the first time, after the emission timing of detection laser light, as an output timing of a reference signal. Then, the DSP 10 opens a predetermined detection window (e.g. 2 μsec.) from the emission timing of detection laser light, and defines a timing at which a peak value over the threshold value is detected within the detection window, as an output timing of an obstacle detection signal. On the other hand, if a peak value over the threshold value is not detected within the detection window, the DSP 10 judges that an obstacle detection signal has not been outputted. Defining the threshold value and the detection window as described above enables to prevent erroneous detection of a reference signal and an obstacle detection signal resulting from a noise signal.

If an obstacle detection signal is detected following a reference signal, the DSP 10 judges that an obstacle is in the intended irradiation position of detection laser light. On the other hand, if an obstacle detection signal is not detected following a reference signal, the DSP 10 judges that no obstacle is in the intended irradiation position of detection laser light.

Further, in the case where the DSP 10 judges that an obstacle is in the irradiation position of detection laser light, the DSP 10 calculates a time difference (t) between the output timing of a reference signal, and the output timing of an obstacle detection signal, which have been detected as described above. The time difference (t) may be defined as a time required for the detection laser light to reciprocate between the scan expansion lens 56 and the obstacle.

After calculating the time difference (t), the DSP 10 calculates a distance to the obstacle based on the following equation:

$$\text{distance to obstacle} = (\text{time difference } t/2) \times \text{propagation velocity of detection laser light}$$

In the embodiment, the propagation velocity of detection laser light is set to e.g. about 300,000 km/sec (a velocity in vacuum).

In the embodiment, detection laser light reflected on the target area is guided to the reflection light detector 59 via the scan expansion lens 56 and the beam splitter 55. This arrangement eliminates the need of additionally providing a condenser lens for condensing detection laser light reflected on the target area. Thereby, this arrangement enables to avoid a drawback that the size of the beam irradiation head 50 may be increased due to provision of a condenser lens.

In the embodiment, detection laser light incident onto the scan expansion lens 56, out of the detection laser light reflected on the target area, is guided to the reflection light detector 59. As described above, the scan expansion lens 56 has a function of increasing the swing width of laser light to be generated by the lens actuator 54. Accordingly, this arrangement enables to guide the detection laser light reflected on the target area to the reflection light detector 59 in a wide swing width range without unduly increasing the lens diameter.

Also, in the embodiment, the distance to the obstacle is obtained based on the time difference between the detection timing of detection laser light reflected on the surface of the scan expansion lens 56, and the detection timing of detection laser light reflected on the obstacle. This is advantageous in enhancing detection precision of the distance to the obstacle.

In other words, in the embodiment, the distance to the obstacle is calculated based on the output timing of an electrical signal being derived from detection laser light (i.e. RE detection laser light) reflected on the incident lens surface 56a of the scan expansion lens 56, and the output timing of an electrical signal being derived from detection laser light (i.e. TG detection laser light) reflected on the obstacle in the target area. In the arrangement, since both of the electrical signals are outputted from the PD 59c as a common element, time lags involved in the electrical signals, and errors resulting from the time lags are made substantially uniform. Accordingly, there is no likelihood that an error based on a circuit delay or a like drawback may be included in the time difference between the output timings of the electrical signals. Thus, the time difference accurately corresponds to a time required for the detection laser light to reciprocate between the scan expansion lens 56 and the obstacle. Therefore, the embodiment is advantageous in enhancing detection precision of the distance to an obstacle, and increasing precision of a laser radar.

Second Embodiment

Figure 5:
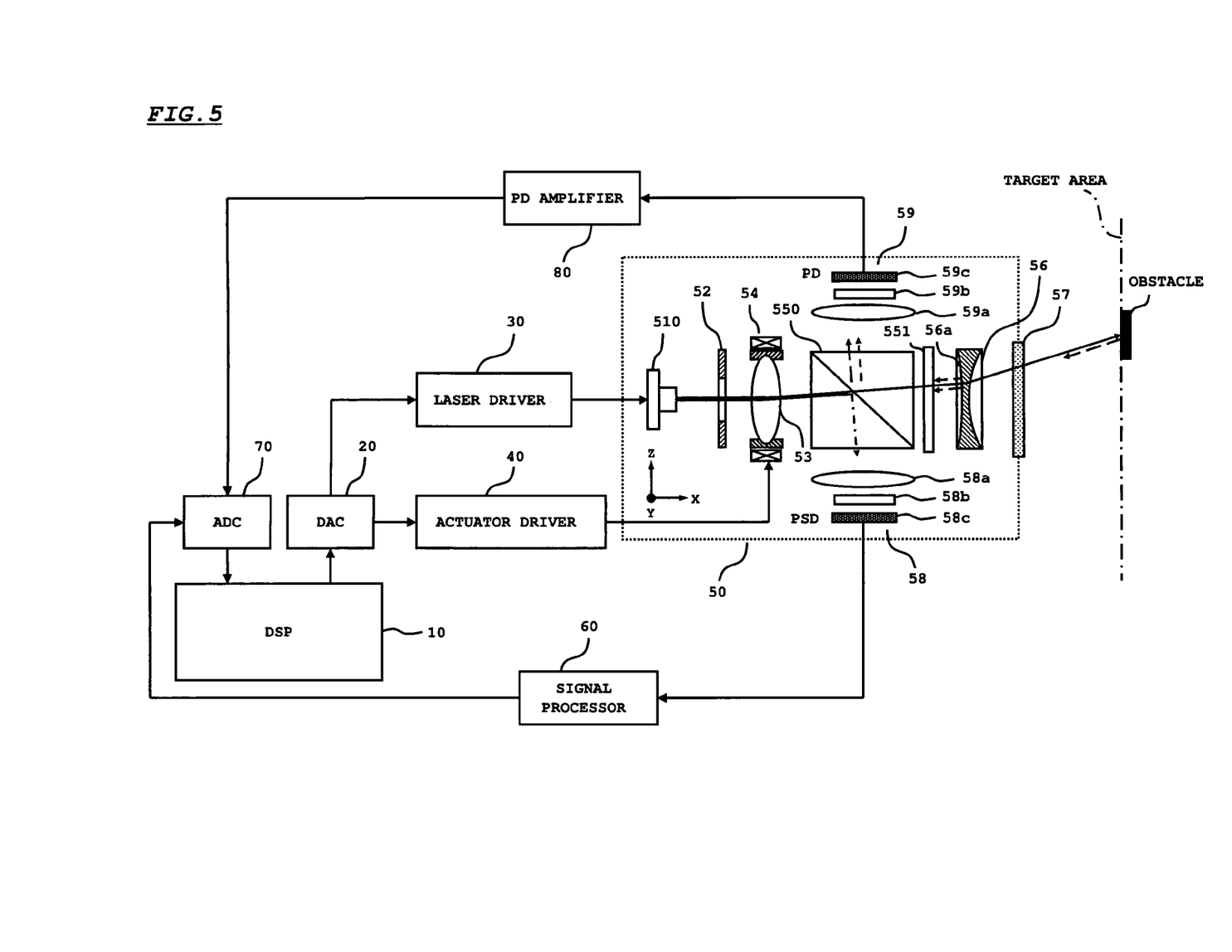
FIG. 5 is a diagram showing an arrangement of a laser radar in accordance with a second embodiment of the invention.

FIG. 5 is a diagram showing an arrangement of a laser radar in accordance with the second embodiment of the invention.

In the second embodiment, a polarized beam splitter 550 is provided in place of the beam splitter 55 in the first embodiment. Also, a quarter wavelength plate 551 is provided between the polarized beam splitter 550 and a scan expansion lens 56. Further, a laser element, provided in a semiconductor laser 510, for emitting detection laser light has such a configuration that the polarization direction of detection laser light is aligned with the polarization direction of P-polarized light with respect to the polarized beam splitter 550. Likewise, a laser element, provided in the semiconductor laser 510, for emitting servo laser light has such a configuration that the polarization direction of servo laser light is aligned with the polarization direction of S-polarized light with respect to the polarized beam splitter 550. The other arrangement of the second embodiment is substantially the same as the corresponding arrangement of the first embodiment.

The detection laser light emitted from the semiconductor laser 510 has a polarization direction aligned with the polarization direction of P-polarized light. Accordingly, the detection laser light is transmitted through the polarized beam splitter 550 and incident onto the quarter wavelength plate 551, without reflecting on the polarized beam splitter 550. The polarization direction of detection laser light is then aligned with the polarization direction of circularly polarized light by the quarter wavelength plate 551. A part of the circularly polarized light is reflected on an incident lens surface 56a of the scan expansion lens 56, and the remainder thereof is irradiated to a target area via the scan expansion lens 56.

In the case where there is an obstacle at an intended irradiation position of detection laser light, reflection light (i.e. TG detection laser light) from the obstacle is incident onto the quarter wavelength plate 551 via the scan expansion lens 56. The TG detection laser light has the polarization direction aligned with the polarization direction of S-polarized light by the quarter wavelength plate 551, and then, is incident onto the polarized beam splitter 550. The TG detection laser light as S-polarized light is reflected on the polarized beam splitter 550 without transmitting through the polarized beam splitter 550, and received on a PD 59c.

The reflection light (i.e. RE detection laser light) from the incident lens surface 56a of the scan expansion lens 56 is incident onto the quarter wavelength plate 551, whereby the polarization direction of RE detection laser light is aligned with the polarization direction of S-polarized light. Then, the RE detection laser light is reflected on the polarized beam splitter 550 without transmitting through the polarized beam splitter 550, and received on the PD 59c.

Servo laser light emitted from the semiconductor laser 510 has the polarization direction aligned with the polarization direction of S-polarized light. Accordingly, the servo laser light is reflected on the polarized beam splitter 550 without transmitting through the polarized beam splitter 550, and received on a PSD 58c.

In the first embodiment, detection laser light to be emitted from the semiconductor laser 51 is attenuated by reflection of a part of the detection laser light on the beam splitter 55, as the light is directed to the target area along the optical path. Further, the detection laser light is attenuated by transmission of a part of the detection laser light through the beam splitter 55, as the light is directed from the target area to the PD 59c along the optical path. Accordingly, a significantly large power loss may be generated before the light is received on the PD 59c.

Unlike the first embodiment, in the arrangement of the second embodiment, the power loss of detection laser light can be suppressed by the function of the polarized beam splitter 550 and the quarter wavelength plate 551. This is advantageous in efficiently guiding the detection laser light to the target area and the PD 59c. Thereby, an obstacle can be detected with high precision, without unduly increasing the emission power of detection laser light by the semiconductor laser 510, and a detectable distance range with respect to the obstacle can be increased.

Third Embodiment

In the first embodiment and the second embodiment, the lens actuator 54 is used as displacing means for displacing the propagation direction of laser light. Alternatively, an actuator other than the lens actuator may be used to displace the propagation direction of laser light.

Figure 6:
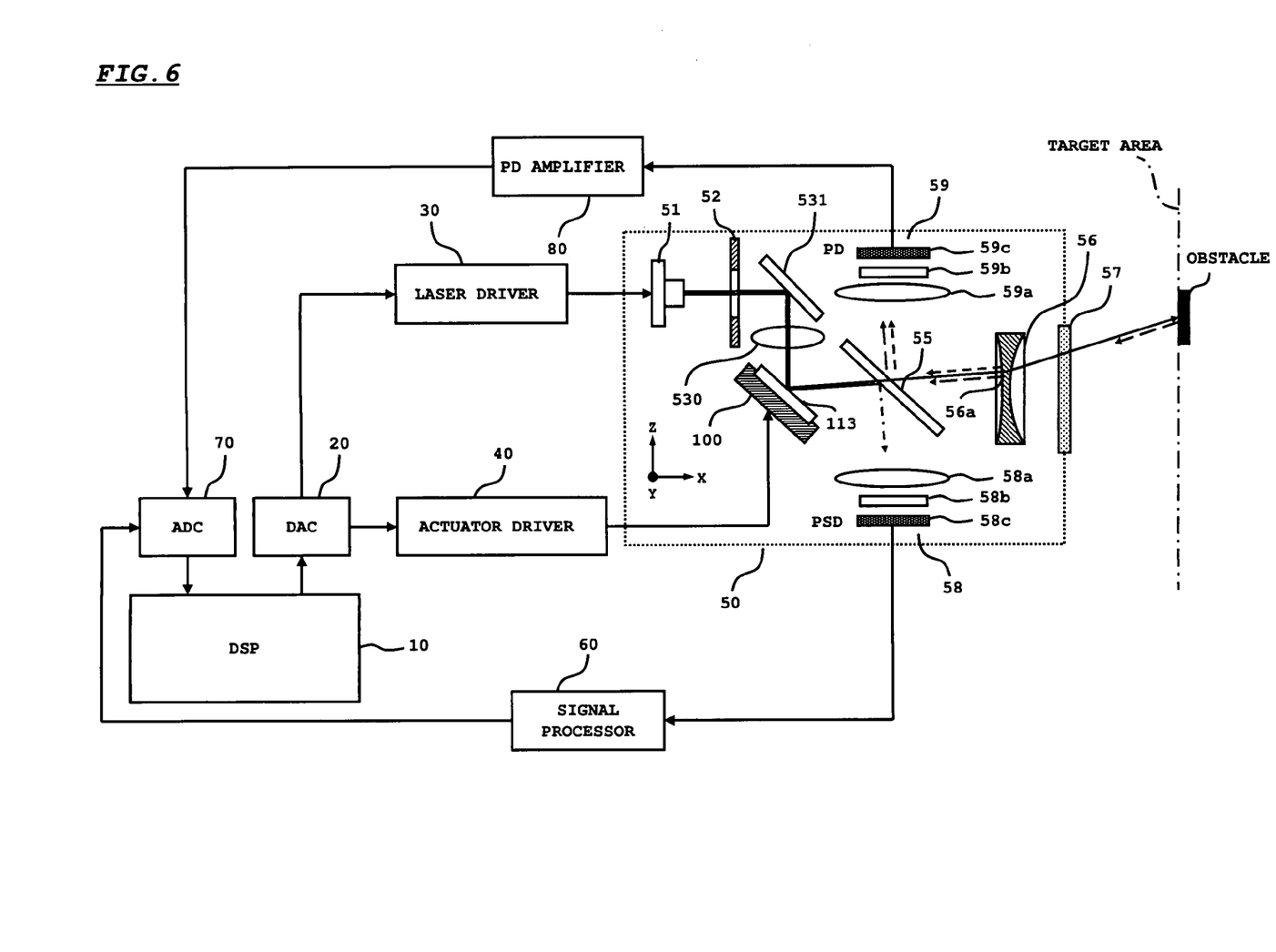
FIG. 6 is a diagram showing an arrangement of a laser radar in accordance with a third embodiment of the invention.

FIG. 6 is a diagram showing an arrangement of a laser radar in accordance with the third embodiment of the invention, wherein a mirror actuator 100 is used as an actuator.

In the embodiment, the mirror actuator 100 is arranged at a position posterior to a condenser lens 530. Laser light (i.e. detection laser light/servo laser light) emitted from a semiconductor laser 51 is reflected on a reflection mirror 531, and incident onto the condenser lens 530. Then, after convergence on the condenser lens 530, the laser light is incident onto a mirror 113 of the mirror actuator 100. The mirror actuator 100 is constructed in such a manner that the mirror 113 is pivotally rotated in horizontal direction and vertical direction. Thereby, a target area is scanned with detection laser light in two-dimensional directions. The arrangement of the third embodiment posterior to the mirror actuator 100 is substantially the same as the corresponding arrangement of the first embodiment. Alternatively, the corresponding arrangement of the second embodiment may be applied.

Figure 7A:
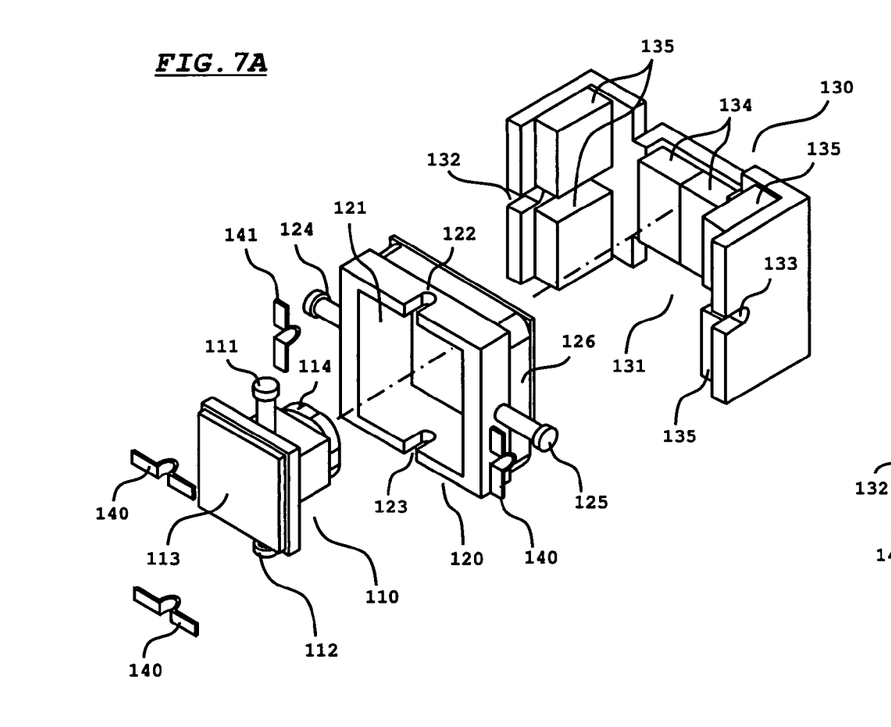
FIG. 7A is an exploded perspective view showing an arrangement of a mirror actuator in the third embodiment.
Figure 7B:
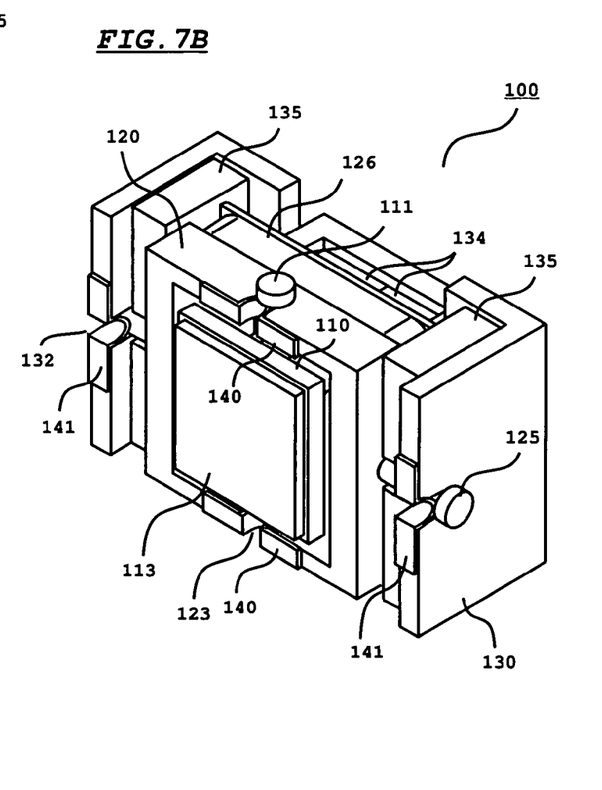
FIG. 7B is a perspective view of the mirror actuator in an assembled state in the third embodiment.

FIGS. 7A and 7B are diagrams showing an arrangement of the mirror actuator 100 in the third embodiment. FIG. 7A is an exploded perspective view of the mirror actuator 100, and FIG. 7B is a perspective view of the mirror actuator 100 in an assembled state.

Referring to FIG. 7A, the reference numeral 110 indicates a mirror holder. Pivot pins 111 and 112 each having a disengagement stopper at an end thereof are formed on the mirror holder 110. The mirror 113 having a flat plate like shape is mounted on a front wall of the mirror holder 110, and a coil 114 is mounted on a rear wall thereof. The coil 114 is wound in a rectangular shape.

The reference numeral 120 indicates a movable frame for pivotally supporting the mirror holder 110 about axes of the pivot pins 111 and 112. An opening 121 for housing the mirror holder 110 is formed in the movable frame 120. Also, grooves 122 and 123 are formed in the movable frame 120 to be engageable with the pivot pins 111 and 112 of the mirror holder 110, respectively. Further, pivot pins 124 and 125 each having a disengagement stopper at an end thereof are formed on side walls of the movable frame 120, respectively. A coil 126 is mounted on a rear wall of the movable frame 120. The coil 126 is wound in a rectangular shape.

The reference numeral 130 indicates a fixed frame for pivotally supporting the movable frame 120 about axes of the pivot pins 124 and 125. A recess 131 for housing the movable frame 120 is formed in the fixed frame 130. Also, grooves 132 and 133 are formed in the fixed frame 130 to be engageable with the pivot pins 124 and 125 of the movable frame 120, respectively. Further, a set of magnets 134 for generating a magnetic field in the coil 114, and two sets of magnets 135 for generating a magnetic field in the coil 126 are mounted on inner walls of the fixed frame 130. The groove 132, 133 extends from a corresponding front wall of the fixed frame 130 to a position corresponding to a clearance between the upper and lower magnets of the corresponding magnet set 135.

The reference numeral 140 each indicates a pressing plate for pressing against the pivot pin 111, 112 of the mirror holder 110 in forward direction to prevent the pivot pin 111, 112 from disengaging from the groove 122, 123 of the movable frame 120. The reference numeral 141 each indicates a pressing plate for pressing against the pivot pins 124, 125 of the movable frame 120 in forward direction to prevent the pivot pin 124, 125 from disengaging from the groove 132, 133 of the fixed frame 130.

In assembling the mirror actuator 100, the pivot pins 111 and 112 of the mirror holder 110 are engaged in the grooves 122 and 123 of the movable frame 120, respectively. Then, the pressing plates 140 are mounted on front walls of the movable frame 120 in such a manner as to press against front surfaces of the pivot pins 111 and 112 of the mirror holder 110, respectively. Thereby, the mirror holder 110 is pivotally supported on the movable frame 120.

After the mirror holder 110 is mounted on the movable frame 120 as described above, the pivot pins 124 and 125 of the movable frame 120 are engaged in the grooves 132 and 133 of the fixed frame 130, respectively. Then, the pressing plates 141 are mounted on the front walls of the fixed frame 130 in such a manner as to press against front surfaces of the pivot pins 124 and 125 of the movable frame 120, respectively. Thereby, the movable frame 120 is pivotally mounted on the fixed frame 130. Thus, assembling of the mirror actuator 100 is completed.

As the mirror holder 110 is pivotally rotated with respect to the movable frame 120 about the axes of the pivot pins 111 and 112, the mirror 113 is pivotally rotated. Also, as the movable frame 120 is pivotally rotated with respect to the fixed frame 130 about the axes of the pivot pins 124 and 125, the mirror holder 110 is pivotally rotated, whereby the mirror 113 is integrally and pivotally rotated with the mirror holder 110. As described above, the mirror holder 110 is pivotally supported in two-dimensional directions by the pivot pins 111 and 112, and the pivot pins 124 and 125 perpendicularly intersecting with each other, and as the mirror holder 110 is pivotally rotated, the mirror 113 is pivotally rotated in the two-dimensional directions.

In the assembled state shown in FIG. 7B, the positions and the polarities of the two magnets 134 are controlled in such a manner that a force for pivotally rotating the mirror holder 110 about the axes of the pivot pins 111 and 112 is generated by application of an electric current to the coil 114. Accordingly, when an electric current is applied to the coil 114, the mirror holder 110 is pivotally rotated about the axes of the pivot pins and 112 by an electromagnetic driving force to be generated in the coil 114.

Likewise, in the assembled state shown in FIG. 7B, the positions and the polarities of the two magnets 135 on each side of the fixed frame 130 are controlled in such a manner that a force for pivotally rotating the movable frame 120 about the axes of the pivot pins 124 and 125 is generated by application of an electric current to the coil 126. In this arrangement, when an electric current is applied to the coil 126, the movable frame is pivotally rotated about the axes of the pivot pins 124 and 125 by an electromagnetic driving force to be generated in the coil 126.

As described above, the mirror holder 110 and the movable frame 120 are pivotally rotated about the axes of the pivot pins 111 and 112, and the axes of the pivot pins 124 and 125 by application of an electric current to the coil 114 and the coil 126, respectively. Thereby, the mirror 113 is integrally and pivotally rotated with the mirror holder 110 in two-dimensional directions.

An actuator driver 40 is configured in such a manner that an electric current is applied to the coil 114 and the coil 126 for driving the mirror actuator 100.

The embodiments of the present invention have been described as above, but the present invention is not limited to the foregoing embodiments. The embodiments of the present invention may be changed or modified in various ways other than the above. Also, the embodiments of the present invention may be changed or modified according to needs, as far as such changes and modifications do not depart from the scope of the present invention hereinafter defined.

What is claimed is:

1. A laser radar, comprising:
   a beam irradiation device for irradiating laser light to a target area; and
   a detection circuit for detecting a state of the target area based on a receiving state of the laser light reflected on the target area,
   the beam irradiation device including:
      a light source for emitting the laser light;
      an actuator for displacing a propagation direction of the laser light in accordance with a control signal;
      a scan expansion lens for increasing a swing width of the laser light generated by the actuator;
      a spectral element, arranged between the actuator and the scan expansion lens, for allowing at least a part of the laser light incident from the actuator to transmit, and reflecting at least a part of the laser light incident from the scan expansion lens in a side direction; and
      a light detector for receiving the reflected incident from the scan expansion lens and the laser light reflected from the target area and further reflected on the spectral element to output an electrical signal, wherein
the detection circuit detects the state of the target area based on the electrical signal outputted from the light detector.

2. The laser radar according to claim 1, wherein
the actuator includes a lens element for allowing incidence of the laser light emitted from the light source, the lens element being displaceable in a direction perpendicular to an optical axis of the laser light.

3. The laser radar according to claim 1, wherein
the actuator includes a mirror element for allowing incidence of the laser light emitted from the light source, the mirror element being pivotally rotatable about an axis perpendicular to an optical axis of the laser light.

4. The laser radar according to claim 1, wherein
a polarized beam splitter is arranged as the spectral element, and
a quarter wavelength plate is arranged between the polarized beam splitter and the scan expansion lens.

5. The laser radar according to claim 1, wherein
the detection circuit calculates a distance to an object in the target area, based on an output timing of the electrical signal being derived from the laser light reflected on a lens surface of the scan expansion lens, and an output timing of the electrical signal being derived from the laser light reflected on the object in the target area.

* * * * *